(12) United States Patent
Kang et al.

(10) Patent No.: US 12,471,103 B2
(45) Date of Patent: Nov. 11, 2025

(54) METHOD AND DEVICE FOR UPLINK OR DOWNLINK TRANSMISSION/RECEPTION SUPPORTING MULTI-CELL SCHEDULING IN WIRELESS COMMUNICATION SYSTEM

(71) Applicant: LG Electronics Inc., Seoul (KR)

(72) Inventors: Jiwon Kang, Seoul (KR); Seonwook Kim, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 540 days.

(21) Appl. No.: 17/912,332

(22) PCT Filed: Mar. 17, 2021

(86) PCT No.: PCT/KR2021/095032
§ 371 (c)(1),
(2) Date: Sep. 16, 2022

(87) PCT Pub. No.: WO2021/187966
PCT Pub. Date: Sep. 23, 2021

(65) Prior Publication Data
US 2023/0134318 A1 May 4, 2023

(30) Foreign Application Priority Data

Mar. 18, 2020 (KR) .................. 10-2020-0033465

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0051* (2013.01); *H04W 16/28* (2013.01); *H04W 72/1263* (2013.01)

(58) Field of Classification Search
CPC . H04W 72/23; H04W 16/28; H04W 72/1263; H04W 72/232; H04W 52/02;
(Continued)

(56) References Cited

U.S. PATENT DOCUMENTS

2013/0039348 A1* 2/2013 Hu .................. H04B 7/0613
370/335
2016/0308653 A1* 10/2016 Dinan ................. H04W 52/02
(Continued)

FOREIGN PATENT DOCUMENTS

KR 20190065179 6/2019

OTHER PUBLICATIONS

NTT DOCOMO, Inc., "Enhancements on multi-TRP/panel transmission," R1-1909201, Presented at 3GPP TSG RAN WG1 #98, Prague, CZ, Aug. 26-30, 2019, 36 pages.
(Continued)

*Primary Examiner* — Kiet Tang
(74) *Attorney, Agent, or Firm* — Fish & Richardson P.C.

(57) ABSTRACT

Disclosed are a method and a device for uplink or downlink transmission/reception supporting multi-cell scheduling in a wireless communication system. According to an embodiment of the present disclosure, a method for performing uplink transmission or downlink reception by a terminal in a wireless communication system may comprise: a downlink control information (DCI) reception step of receiving, on a first cell, DCI for scheduling of an uplink physical channel or a downlink physical channel, wherein the DCI includes first information related to a scheduled cell, and second information related to a spatial parameter for the scheduled uplink physical channel or downlink physical channel; and
(Continued)

a step of, on the basis of the DCI, performing transmission of the uplink physical channel or reception of the downlink physical channel on the scheduled cell, wherein the first information and the second information are joint-encoded by one or more fields included in the DCI.

15 Claims, 11 Drawing Sheets

(51) Int. Cl.
*H04W 16/28* (2009.01)
*H04W 72/1263* (2023.01)

(58) Field of Classification Search
CPC ... H04L 5/0051; H04L 5/0048; H04L 5/0094; H04L 5/0035; H04L 5/0023; H04L 5/0053; H04B 7/0695; H04B 7/0613; Y02D 30/70
See application file for complete search history.

(56) References Cited

U.S. PATENT DOCUMENTS

| | | |
|---|---|---|
| 2019/0313429 A1 | 10/2019 | Cheng |
| 2019/0357238 A1 | 11/2019 | Zhou et al. |
| 2021/0336664 A1* | 10/2021 | Yang ............... H04B 7/0456 |
| 2022/0264561 A1* | 8/2022 | Fan ............... H04B 7/0695 |
| 2023/0217429 A1* | 7/2023 | Faxér ............... H04L 5/0051 370/329 |

OTHER PUBLICATIONS

ZTE, "On PDCCH enhancements for NR URLLC," R1-1904143, Presented at 3GPP TSG RAN WG1 #96bis, Xi'an, China, Apr. 8-12, 2019, 9 pages.
CATT, "Remaining details on beam management," R1-1720182, 3GPP TSG RAN WG1 Meeting 91, Reno, USA, Nov. 27-Dec. 1, 2017, 11 pages.
Ericsson, "Summary of 7.3.1.4 (DCI contents and formats)," R1-1801012, TSG-RAN WG1 AdHoc 1801, Vancouver, Canada, Jan. 22-26, 2018, 12 pages.
LG Electronics, "Discussion on DL/UL beam management," R1-1717941, 3GPP TSG RAN WG1 Meeting 90bis, Prague, CZ, Oct. 9-13, 2017, 6 pages.
LG Electronics, "Discussion on multi-beam based operations and enhancements," R1-1910583, 3GPP TSG RAN WG1 Meeting #98bis, Chongqing, China, Oct. 14-20, 2019, 8 pages.
Office Action in Korean Appln. No. 10-2022-7031405, mailed on Jan. 24, 2025, 10 pages (with English translation).
Vivo, "DCI contents and design," R1-1719783, 3GPP TSG RAN WG1 NR Meeting 91, Reno, USA, Nov. 27-Dec. 1, 2017, 6 pages.
ZTE, "Enhancements on multi-beam operation," R1-1911931, 3GPP TSG RAN WG1 Meeting #99, Reno, US, Nov. 18-22, 2019, 18 pages.

* cited by examiner

FIG. 8

| R | Serving Cell ID | BWP ID | Oct 1 |
|---|---|---|---|
| $C_0$ | TCI state $ID_{0,1}$ | | Oct 2 |
| R | TCI state $ID_{0,2}$ | | Oct 3 (Optional) |

...

| $C_N$ | TCI state $ID_{N,1}$ | Oct M-1 |
|---|---|---|
| R | TCI state $ID_{N,2}$ | Oct M (Optional) |

METHOD AND DEVICE FOR UPLINK OR DOWNLINK TRANSMISSION/RECEPTION SUPPORTING MULTI-CELL SCHEDULING IN WIRELESS COMMUNICATION SYSTEM

CROSS-REFERENCE TO RELATED APPLICATIONS

This application is a National Stage application under 35 U.S.C. § 371 of International Application No. PCT/KR2021/095032, filed on Mar. 17, 2021, which claims the benefit of Korean Application No. 10-2020-0033465, filed on Mar. 18, 2020. The disclosures of the prior applications are incorporated by reference in their entirety.

TECHNICAL FIELD

The present disclosure relates to a wireless communication system, and in more detail, relates to a method and a device of transmitting and receiving an uplink or a downlink supporting multi-cell scheduling in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical problem of the present disclosure is to provide a method and a device of transmitting and receiving an uplink or a downlink supporting multi-cell scheduling in a wireless communication system.

An additional technical problem of the present disclosure is to provide a method and a device of indicating one or more of a spatial parameter or a scheduled cell by control information for uplink or downlink scheduling in a wireless communication system.

The technical objects to be achieved by the present disclosure are not limited to the above-described technical objects, and other technical objects which are not described herein will be clearly understood by those skilled in the pertinent art from the following description.

Technical Solution

A method of performing uplink transmission or downlink reception by a terminal in a wireless communication system according to an aspect of the present disclosure may include receiving downlink control information (DCI) scheduling an uplink physical channel or a downlink physical channel in a first cell, wherein the DCI includes first information related to a scheduled cell, and second information related to a spatial parameter on the uplink physical channel or the downlink physical channel to be scheduled; and performing the uplink physical channel transmission or the downlink physical channel reception in the scheduled cell based on the DCI, and the first information and the second information may be joint-encoded by one or more fields included in the DCI.

A method of performing uplink reception or downlink transmission by a base station in a wireless communication system according to an additional aspect of the present disclosure may include transmitting downlink control information (DCI) scheduling an uplink physical channel or a downlink physical channel in a first cell, wherein the DCI includes first information related to a scheduled cell, and second information related to a spatial parameter on the uplink physical channel or the downlink physical channel to be scheduled; and performing the uplink physical channel reception or the downlink physical channel transmission in the scheduled cell based on the DCI, and the first information and the second information may be joint-encoded by one or more fields included in the DCI.

Technical Effects

According to an embodiment of the present disclosure, a method and a device of transmitting and receiving an uplink or a downlink supporting multi-cell scheduling in a wireless communication system may be provided.

According to an embodiment of the present disclosure, a method and a device of indicating one or more of a spatial parameter or a scheduled cell by control information for uplink or downlink scheduling in a wireless communication system may be provided.

According to an embodiment of the present disclosure, based on a downlink control channel transmitted from MTRPs, even when TCI information is not included in downlink control information (DCI), a TCI associated with a downlink data channel may be clearly configured or determined.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

FIG. 8 is a diagram which represents an example of a TCI state activation/deactivation MAC CE to which the present disclosure may be applied.

BEST MODE

Figure 1:
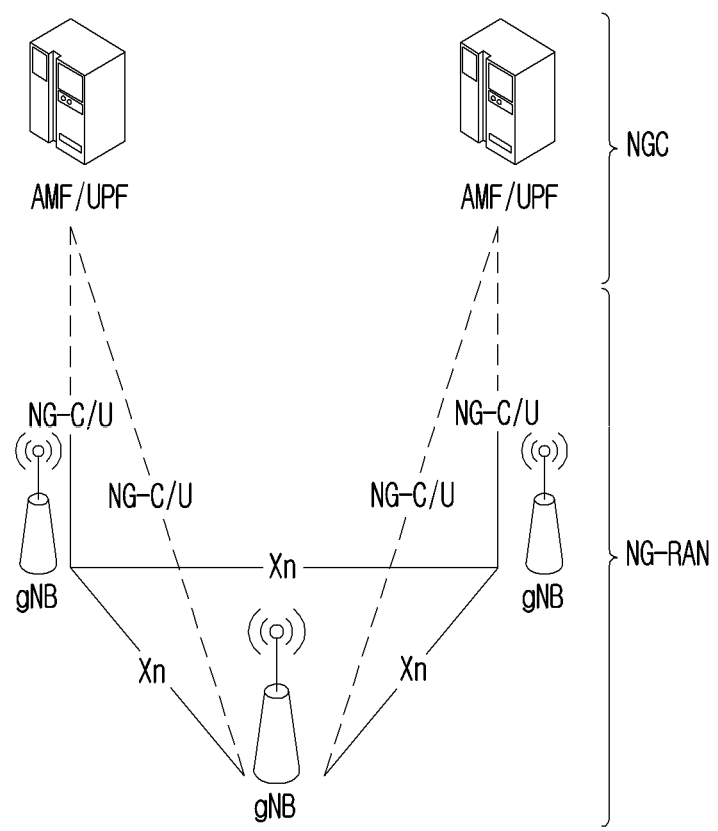
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.
BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
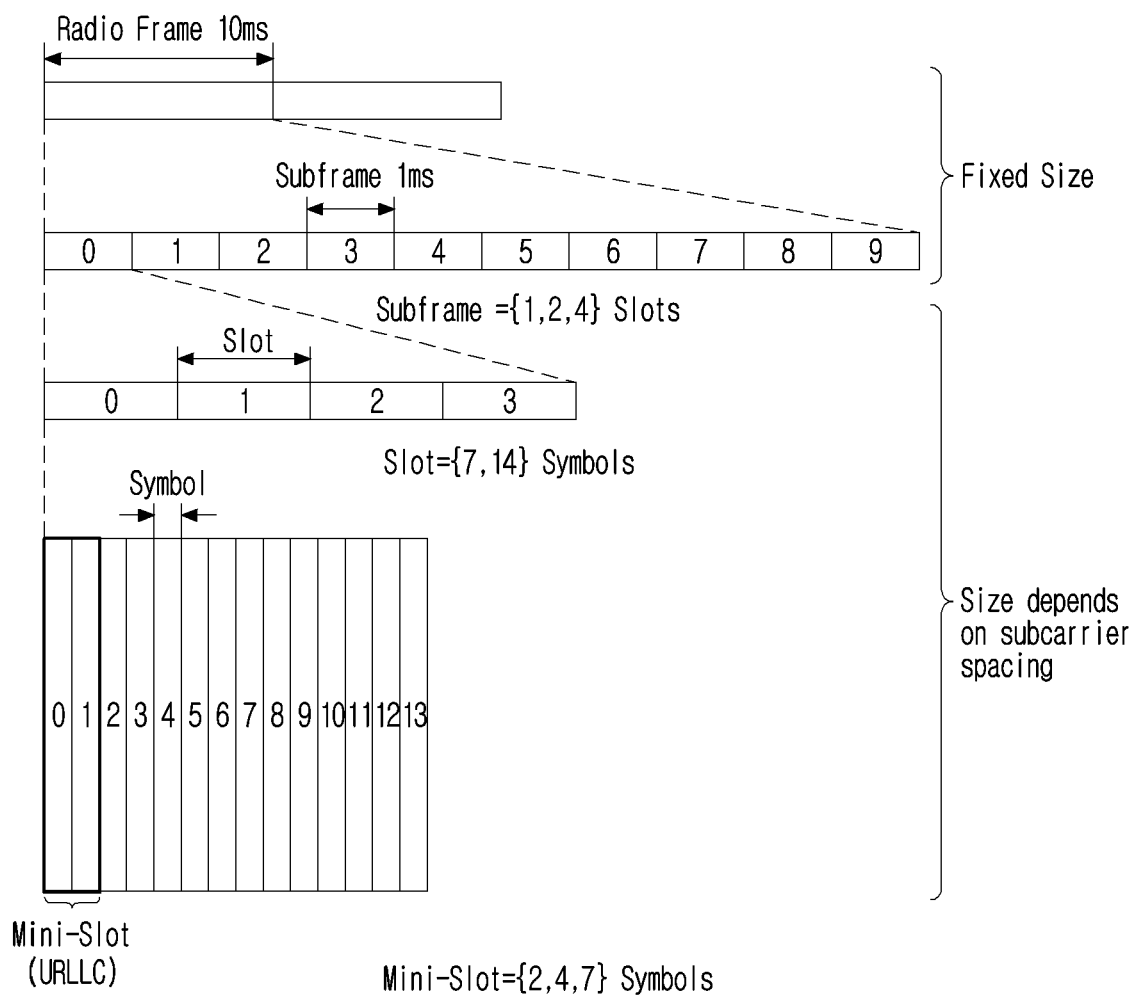
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf = $2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_{s,f}^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |

TABLE 3-continued

| μ | $N_{symb}^{slot}$ | $N_{slot}^{frame,\mu}$ | $N_{slot}^{subframe,\mu}$ |
|---|---|---|---|
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
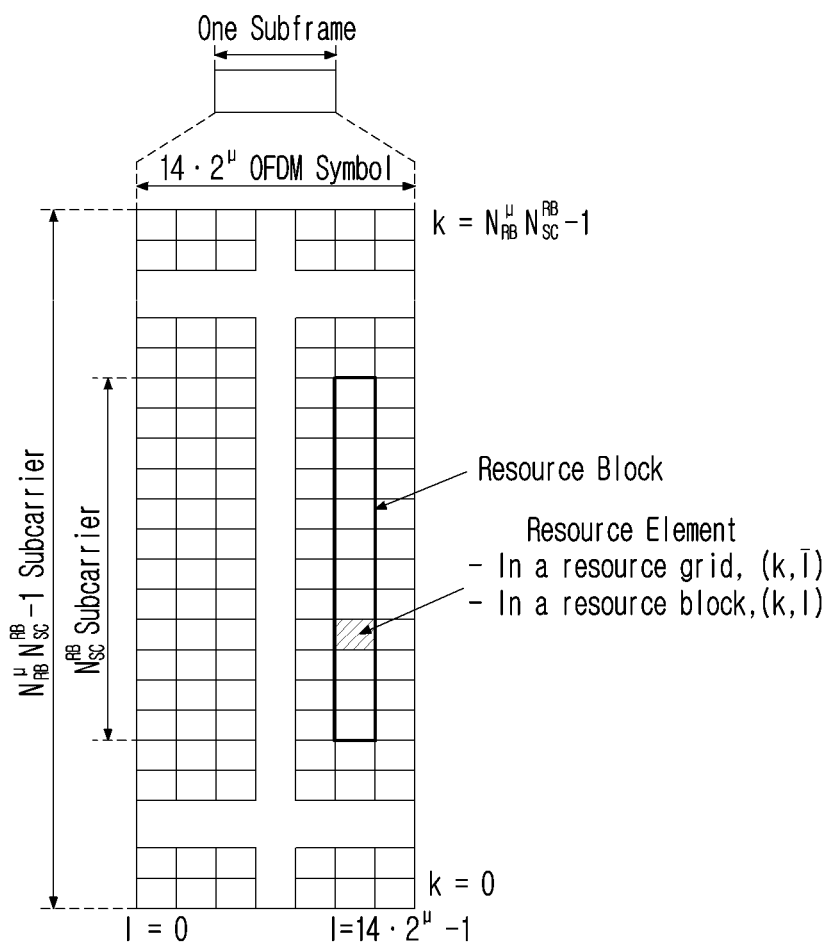
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , $N_{RB}^\mu N_{sc}^{RB}-1$ is an index in a frequency domain and l'=0, . . . , $2^\mu N_{symb}^{(\mu)}-1$ refers to a position of a symbol in a subframe. When referring to a resource element in a slot, an index pair (k,l) is used. Here, l=0, . . . , $N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \qquad \text{[Equation 2]}$$

$N_{BWP,i}^{start,\mu}$ is a common resource block that a BWP starts relatively to common resource block 0.

Figure 4:
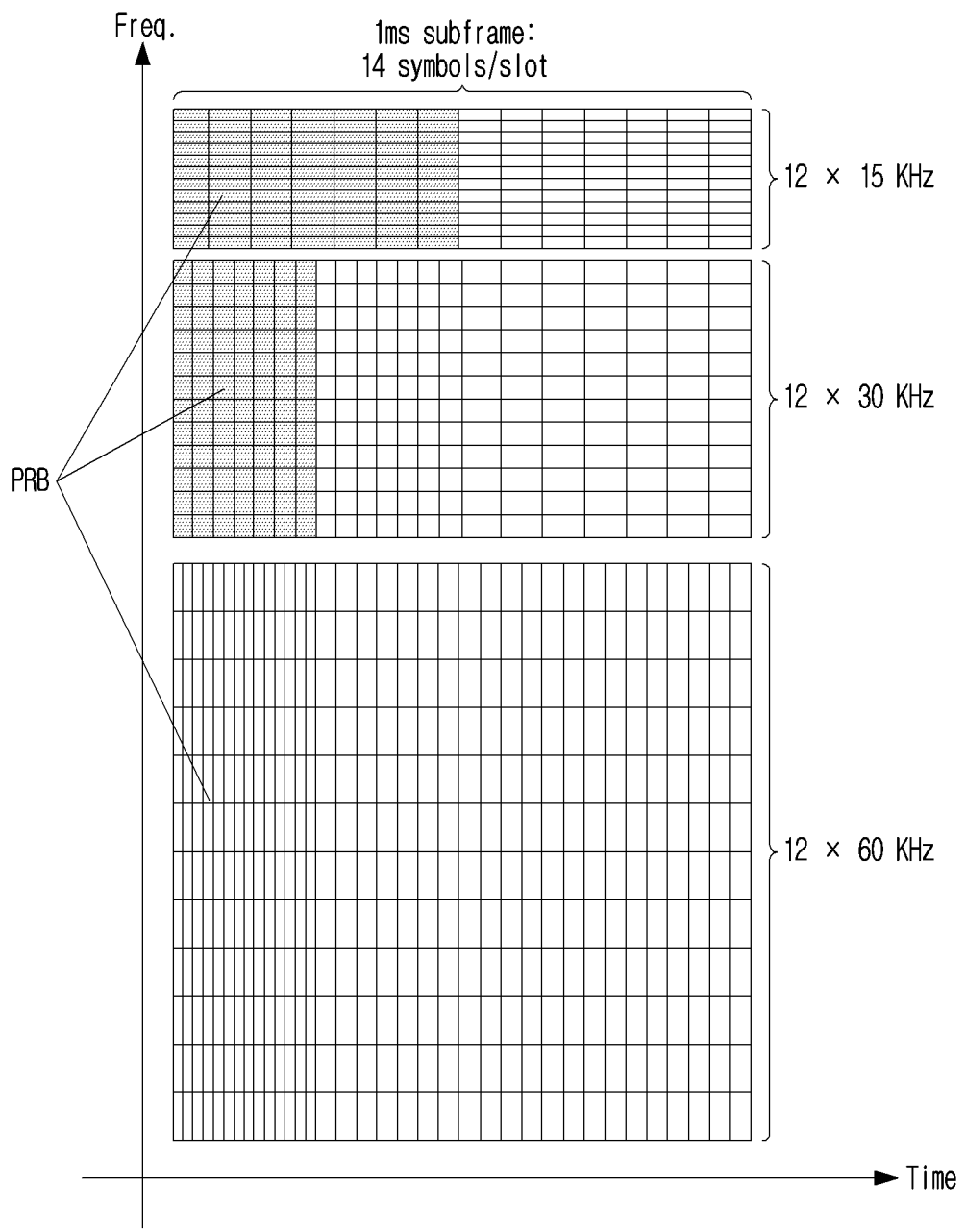
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
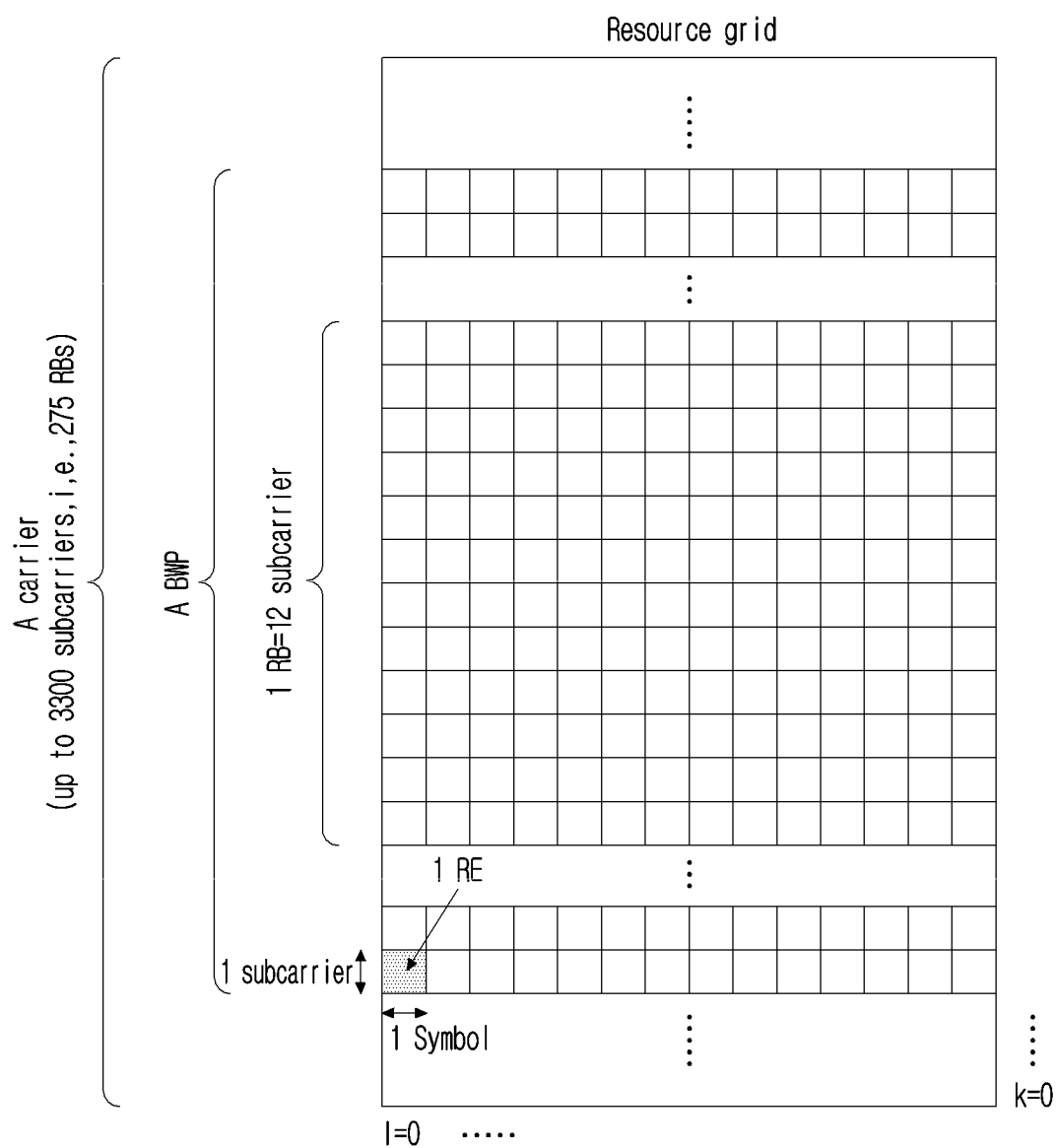
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
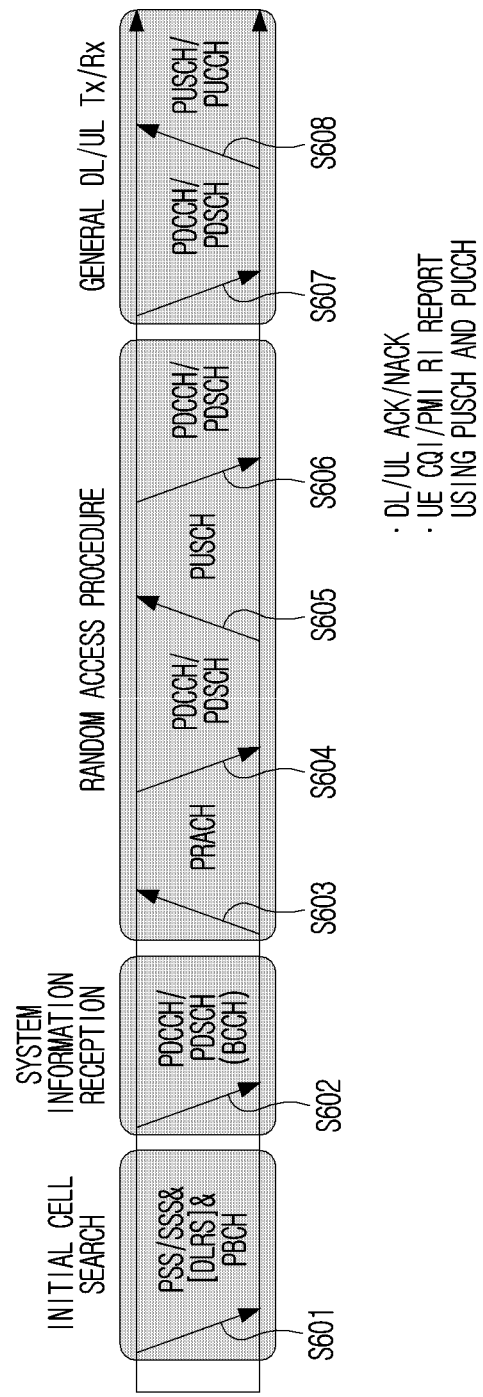
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs) (or CORESETs belonging to different CORE- SET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH) transmitted to different panels belonging to the same TRP.

Hereinafter, multiple DCI based non-coherent joint transmission (NCJT)/single DCI based NCJT will be described.

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Multiple TRPs (MTRPs) performing NCJT transmission may transmit DL data to a terminal by using any one scheme of the following two schemes.

First, 'a single DCI based MTRP scheme' is described. MTRPs cooperatively transmit one common PDSCH and each TRP participating in cooperative transmission spatially partitions and transmits a corresponding PDSCH into different layers (i.e., different DMRS ports) by using the same time frequency resource. Here, scheduling information on the PDSCH is indicated to UE through one DCI and which DMRS (group) port uses which QCL RS and QCL type information is indicated by the corresponding DCI (which is different from DCI indicating a QCL RS and a type which will be commonly applied to all DMRS ports indicated as in the existing scheme). In other words, M TCI states may be indicated through a TCI (Transmission Configuration Indicator) field in DCI (e.g., for 2 TRP cooperative transmission, M=2) and a QCL RS and a type may be indicated by using M different TCI states for M DMRS port group. In addition, DMRS port information may be indicated by using a new DMRS table.

Next, 'a multiple DCI based MTRP scheme' is described. Each of MTRPs transmits different DCI and PDSCH and (part or all of) the corresponding PDSCHs are overlapped each other and transmitted in a frequency time resource. Corresponding PDSCHs may be scrambled through a different scrambling ID (identifier) and the DCI may be transmitted through a CORESET belonging to a different CORESET group. (Here, a CORESET group may be identified by an index defined in a CORESET configuration of each CORESET. For example, when index=0 is configured for CORESETs 1 and 2 and index=1 is configured for CORESETs 3 and 4, CORESETs 1 and 2 are CORESET group 0 and CORESET 3 and 4 belong to a CORESET group 1. In addition, when an index is not defined in a CORESET, it may be construed as index=0) When a plurality of scrambling IDs are configured or two or more CORESET groups are configured in one serving cell, a UE may notice that it receives data according to a multiple DCI based MTRP operation.

Alternatively, whether of a single DCI based MTRP scheme or a multiple DCI based MTRP scheme may be indicated to UE through separate signaling. In an example, for one serving cell, a plurality of CRS (cell reference signal) patterns may be indicated to UE for a MTRP operation. In this case, PDSCH rate matching for a CRS may be different depending on a single DCI based MTRP scheme or a multiple DCI based MTRP scheme (because a CRS pattern is different).

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 7:
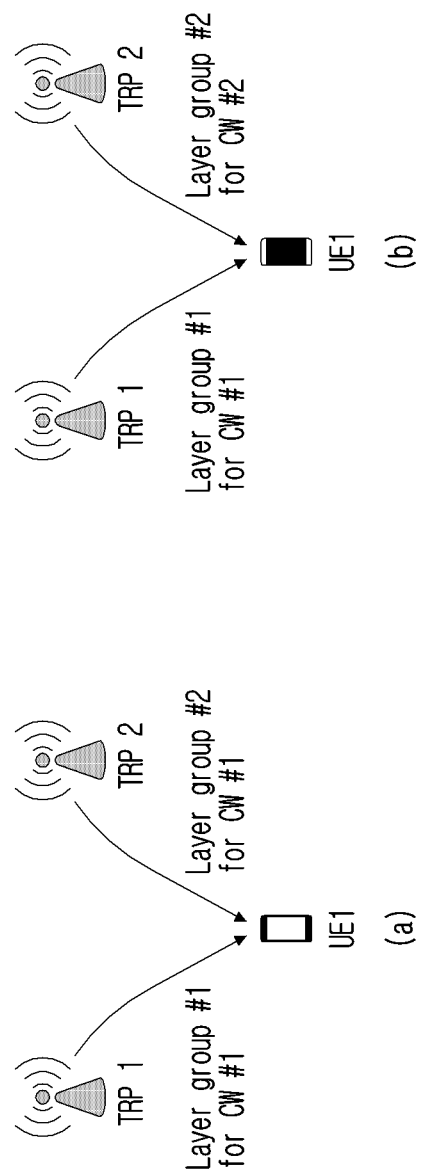
FIG. 7 illustrates a method of transmitting multiple TRPs in a wireless communication system to which the present disclosure may be applied.

FIG. 7 illustrates a method of multiple TRPs transmission in a wireless communication system to which the present disclosure may be applied.

In reference to FIG. 7(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(b), it may have a disadvantage that a code rate corresponding to a TB is higher compared to FIG. 7(a). However, it has an advantage that it may adjust a code rate by indicating a different RV (redundancy version) value or may adjust a modulation order of each CW for encoded bits generated from the same TB according to a channel environment.

According to methods illustrated in FIG. 7(a) and FIG. 7(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following method is discussed.

1) Method 1 (SDM): Time and Frequency Resource Allocation is Overlapped and n (n<=Ns) TCI States in a Single Slot 1-a) Method 1a
  The same TB is transmitted in one layer or layer set at each transmission time (occasion) and each layer or each layer set is associated with one TCI and one set of DMRS port(s).
  A single codeword having one RV is used in all spatial layers or all layer sets. With regard to UE, different coded bits are mapped to a different layer or layer set by using the same mapping rule.

1-b) Method 1b
  The same TB is transmitted in one layer or layer set at each transmission time (occasion) and each layer or each layer set is associated with one TCI and one set of DMRS port(s).
  A single codeword having one RV is used in each spatial layer or each layer set. RV(s) corresponding to each spatial layer or each layer set may be the same or different.

1-c) Method 1c
  At one transmission time (occasion), the same TB having one DMRS port associated with multiple TCI state indexes is transmitted in one layer or the same TB having multiple DMRS ports one-to-one associated with multiple TCI state indexes is transmitted in one layer.

In case of the method 1a and 1c, the same MCS is applied to all layers or all layer sets.

2) Method 2 (FDM): Frequency Resource Allocation is not Overlapped and n (n<=Nf) TCI States in a Single Slot
  Each non-overlapping frequency resource allocation is associated with one TCI state.
  The same single/multiple DMRS port(s) are associated with all non-overlapping frequency resource allocation.

2-a) Method 2a
  A single codeword having one RV is used for all resource allocation. With regard to UE, common RB matching (mapping of a codeword to a layer) is applied to all resource allocation.

2-b) Method 2b
  A single codeword having one RV is used for each non-overlapping frequency resource allocation. A RV corresponding to each non-overlapping frequency resource allocation may be the same or different.

For the method 2a, the same MCS is applied to all non-overlapping frequency resource allocation.

3) Method 3 (TDM): Time Resource Allocation is not Overlapped and n (n<=Nt1) TCI States in a Single Slot
  Each transmission time (occasion) of a TB has time granularity of a mini-slot and has one TCI and one RV.
  A common MCS is used with a single or multiple DMRS port(s) at every transmission time (occasion) in a slot.
  A RV/TCI may be the same or different at a different transmission time (occasion).

4) Method 4 (TDM): N (n<=Nt2) TCI States in K (n<=K) Different Slots
  Each transmission time (occasion) of a TB has one TCI and one RV.
  Every transmission time (occasion) across K slots uses a common MCS with a single or multiple DMRS port(s).
  A RV/TCI may be the same or different at a different transmission time (occasion).

Hereinafter, MTRP URLLC is described.

In the present disclosure, DL MTRP URLLC means that multiple TRPs transmit the same data (e.g., the same TB)/DCI by using a different layer/time/frequency resource. For example, TRP 1 transmits the same data/DCI in resource 1 and TRP 2 transmits the same data/DCI in resource 2. UE configured with a DL MTRP-URLLC transmission method receives the same data/DCI by using a different layer/time/frequency resource. Here, UE is configured from a base station for which QCL RS/type (i.e., a DL TCI state) should be used in a layer/time/frequency resource receiving the same data/DCI. For example, when the same data/DCI is received in resource 1 and resource 2, a DL TCI state used in resource 1 and a DL TCI state used in resource 2 may be configured. UE may achieve high reliability because it receives the same data/DCI through resource 1 and resource 2. Such DL MTRP URLLC may be applied to a PDSCH/a PDCCH.

And, in the present disclosure, UL MTRP-URLLC means that multiple TRPs receive the same data/UCI (uplink control information) from any UE by using a different layer/time/frequency resource. For example, TRP 1 receives the same data/DCI from UE in resource 1 and TRP 2 receives the same data/DCI from UE in resource 2 to share received data/DCI through a backhaul link connected between TRPs. UE configured with a UL MTRP-URLLC transmission method transmits the same data/UCI by using a different layer/time/frequency resource. In this case, UE is configured from a base station for which Tx beam and which Tx power (i.e., a UL TCI state) should be used in a layer/time/frequency resource transmitting the same data/DCI. For example, when the same data/UCI is transmitted in resource 1 and resource 2, a UL TCI state used in resource 1 and a UL TCI state used in resource 2 may be configured. Such UL MTRP URLLC may be applied to a PUSCH/a PUCCH.

In addition, in the present disclosure, when a specific TCI state (or TCI) is used (or mapped) in receiving data/DCI/UCI for any frequency/time/space resource (layer), it means as follows. For a DL, it may mean that a channel is estimated from a DMRS by using a QCL type and a QCL RS indicated by a corresponding TCI state in that frequency/time/space resource (layer) and data/DCI is received/demodulated based on an estimated channel. In addition, for a UL, it may mean that a DMRS and data/UCI are transmitted/modulated by using a Tx beam and power indicated by a corresponding TCI state in that frequency/time/space resource.

Here, an UL TCI state has Tx beam and/or Tx power information of UE and may configure spatial relation information, etc. to UE through other parameter, instead of a TCI state. An UL TCI state may be directly indicated by UL grant DCI or may mean spatial relation information of a SRS resource indicated by a SRI (sounding resource indicator) field of UL grant DCI. Alternatively, it may mean an open loop (OL) Tx power control parameter connected to a value indicated by a SRI field of UL grant DCI (e.g., j: an index for open loop parameter Po and alpha (up to 32 parameter value sets per cell), q_d: an index of a DL RS resource for PL (pathloss) measurement (up to 4 measurements per cell), 1: a closed loop power control process index (up to 2 processes per cell)).

Hereinafter, MTRP eMBB is described.

In the present disclosure, MTRP-eMBB means that multiple TRPs transmit different data (e.g., a different TB) by using a different layer/time/frequency. UE configured with a MTRP-eMBB transmission method receives an indication on multiple TCI states through DCI and assumes that data received by using a QCL RS of each TCI state is different data.

On the other hand, UE may figure out whether of MTRP URLLC transmission/reception or MTRP eMBB transmission/reception by separately dividing a RNTI for MTRP-URLLC and a RNTI for MTRP-eMBB and using them. In other words, when CRC masking of DCI is performed by using a RNTI for URLLC, UE considers it as URLLC transmission and when CRC masking of DCI is performed by using a RNTI for eMBB, UE considers it as eMBB transmission. Alternatively, a base station may configure MTRP URLLC transmission/reception or TRP eMBB transmission/reception to UE through other new signaling.

In a description of the present disclosure, it is described by assuming cooperative transmission/reception between 2 TRPs for convenience of a description, but a method proposed in the present disclosure may be also extended and applied in 3 or more multiple TRP environments and in addition, it may be also extended and applied in multiple panel environments (i.e., by matching a TRP to a panel). In addition, a different TRP may be recognized as a different TCI state to UE. Accordingly, when UE receives/transmits data/DCI/UCI by using TCI state 1, it means that data/DCI/UCI is received/transmitted from/to a TRP 1.

Quasi-Co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Dynamic Spectrum Sharing (DSS)

To gradually introduce 5G NR service, a scenario that 5G NR service is enabled only by upgrading software for a base station that the existing LTE service is provided may be considered. In this case, in a specific frequency band, a base station may service both a LTE and NR system and the existing LTE terminal may receive LTE service and a NR terminal may receive NR service. For example, a situation may be assumed that a base station has carrier #1 (e.g., 1.8 GHz) that a LTE and NR system are operated together and carrier #2 (e.g., 3.5 GHz) that only a NR system is operated and a NR terminal which communicates with a corresponding base station simultaneously accesses through carrier aggregation (CA) between carrier #1 and carrier #2. In this case, given wide coverage which is a characteristic of low frequency, it may be desirable to configure carrier #1 as a PCell (primary cell). But, in carrier #1, a base station shall be able to service LTE simultaneously. Here, servicing LTE means that an always-on signal like a CRS (cell-specific reference signal) may be transmitted and a resource for PDCCH transmission (e.g., a control region) may be reserved in first several symbols of every subframe. Meanwhile, it is not necessarily required to transmit a CRS and reserve a control region in a NR system. When a base station provides NR service in carrier #1 under this condition, there may be a disadvantage that resources which may be used for a NR terminal fall short.

To overcome this disadvantage, a method of transmitting DCI scheduling DL/UL data which will be transmitted in a PCell in a SCell may be considered. For other method, a method of simultaneously scheduling DL (or UL) data which will be transmitted in a PCell as well as DL (or UL) data which will be transmitted in a corresponding SCell through one scheduling DCI transmitted in a SCell may be considered. Such a scheduling method may be generally referred to as multi-component carrier (multi-CC) scheduling.

Unless specifically limited in the present disclosure, a term of a CC may be substituted with a carrier, a cell or a BWP.

Multi-CC scheduling described in the present disclosure may mean scheduling DL/UL data which will be transmitted in the first cell and/or one or more second cells through one scheduling DCI transmitted in a first cell.

Cross-CC scheduling described in the present disclosure may mean scheduling DL/UL data which will be transmitted in a second cell through scheduling DCI transmitted in a first cell.

Own-CC scheduling described in the present disclosure may mean scheduling DL/UL data which will be transmitted in a first cell through scheduling DCI transmitted in a first cell.

In the description, each of a first cell and (one or more) second cells may correspond to any one cell (or CC) without distinguishing between a PCell or a SCell.

Indication of DCI Based Cell and Spatial Parameter

In the present disclosure, it is about a method of indicating one or more of one or more scheduled cells or a spatial parameter (e.g., a RS) applied to transmission and reception of a scheduled DL/UL data channel through one or more fields in DCI scheduling DL/UL data.

Examples of the present disclosure may be applied to multi-CC scheduling, cross-CC scheduling, and own-CC scheduling. To support these various scheduling methods, it is needed to indicate a cell ID and a spatial parameter, etc. in the existing scheduling information (e.g., scheduling DCI) for each scheduled cell and each DL/UL data channel, so a signaling overhead of DCI may increase. According to the present disclosure, through one or more fields in DCI (e.g., one or more of a TCI field, a SRI field, or a scheduling state field), a cell and a spatial parameter related to various scheduling methods may be indicated. Accordingly, a variety of scheduling methods may be efficiently supported by reducing a DCI signaling overhead (or A DCI size or the number of DCI formats).

These various scheduling methods may be also applied to DSS, but a scope of the present disclosure is not limited thereto, and it may be applied for a variety of purposes for reducing an overhead of scheduling control information.

As a specific example, DSS considers supporting both cross-CC scheduling and multi-CC scheduling. For example, for NR DSS in various FRs, PDCCH enhancement for supporting cross-CC scheduling is discussed. Regarding it, an operation that a PDCCH of a SCell schedules a PDSCH or a PUSCH in a P(S)Cell (i.e., a PCell or a PSCell (Primary Secondary Cell)) and an operation that a PDCCH of a P(S)Cell/SCell schedules a PDSCH in multi-cells by using single DCI may be considered. In this case, the number of cells scheduled simultaneously may be equal to or greater than 2. In addition, it is required to minimize an increase in a DCI size for supporting it. In addition, it is required not to change expenses for PDCCH blind decoding (e.g., the number of blind decoding, a resource for blind decoding, etc.) to support it, which may include not increasing the number of DCI format candidates. In addition, such a scheduling method is not restrictively applied to DSS and may be also applied to cross-CC scheduling in general CA.

Specifically, when the existing DCI is simply extended to support multi-CC scheduling by using single DCI, a variety of information transmitted through DCI should be transmitted per CC, so it is highly probable that a DCI overhead will increase. The present disclosure includes examples through (or by reusing) a TCI field or a SRI field which was previously defined in DCI in order not to increase a DCI overhead or to minimize an increase. In addition, the present disclosure includes examples which distinguish between multi-CC scheduling and single-CC scheduling, and further which distinguish between own-CC scheduling (i.e., when a scheduling cell is the same as a scheduled cell) and cross-CC scheduling (i.e., when a scheduling cell is different from a scheduled cell) among single-CC scheduling. Additionally, the present disclosure includes examples which indicate an identifier for a scheduled cell (e.g., a CC/a cell/a carrier ID) through (or by reusing) the existing TCI field or SRI field or in connection with other signaling information.

In the present disclosure, division between a single-TRP (S-TRP) and multi-TRPs (M-TRP) is just an example related to implementation of the present disclosure and does not limit a scope of the present disclosure. In addition, in the present disclosure, a term of a TRP, as described above, may be applied by being substituted with an expression such as a panel, a cell, a transmission point (TP), a base station (gNB, etc.), etc. In addition, as described above, a TRP may be divided according to information on a CORESET group (or a CORESET pool) (e.g., an index). In an example, when one terminal is configured to perform transmission and reception with multiple TRPs (or cells), it may mean that multiple CORESET groups (or CORESET pools) are configured for one terminal. Such a configuration on a CORESET group (or a CORESET pool) may be performed through higher layer signaling (e.g., RRC signaling, etc.). In addition, from the viewpoint of a terminal operation, a S-TRP/M-TRPs may be divided according to whether an estimate for a specific QCL parameter (e.g., delay spread, average delay, Doppler spread, Doppler shift, average gain, or a spatial Rx parameter) is used/applied by being acquired from a single QCL reference RS or is used/applied by being acquired from a plurality of QCL reference RSs.

In addition, in the present disclosure, when a specific spatial parameter is used/mapped in receiving data/DCI/UCI for any frequency/time/space resource, it may mean that a DL estimates a channel from a DMRS by using a QCL type and a QCL RS indicated by a corresponding spatial parameter in that frequency/time/space resource and receives/ demodulates data/DCI to an estimated channel. It may mean that a UL transmits/modulates a DMRS and data/UCI by using a Tx beam and/or Tx power indicated by a corresponding spatial parameter in that frequency/time/space resource.

In the present disclosure, a spatial parameter (or a beam transmission and reception related parameter) may include QCL information applied to (or assumed by a terminal) an uplink/downlink physical channel that control information/data is transmitted. QCL information may include QCL RS information and QCL RS information may be configured per QCL type (e.g., QCL type A/B/C/D). But, in the present disclosure, a term of a spatial parameter is not limited to QCL information. For example, a spatial parameter may include a TCI state, a TCI codepoint, etc. applied for downlink channel transmission and reception and may include spatial relation information, a SRI, a PRI (PUCCH resource indicator), etc., a spatial parameter applied for uplink transmission.

In addition, a spatial parameter may be separately configured for a downlink or an uplink or may be integrated and configured for a downlink and an uplink.

In addition, a spatial parameter may be also defined or configured as a spatial parameter set including one or more spatial parameters. Hereinafter, one or more spatial parameters are collectively referred to as a spatial parameter to simplify a description.

In addition, a plurality of spatial parameter candidates may be configured for a terminal through RRC signaling and among them, one or more specific spatial parameter sets which will be used (or activated) for DL/UL transmission may be selected and indicated through MAC-CE signaling. Here, one spatial parameter set (or codepoint) may be mapped to one spatial parameter and one spatial parameter set (or codepoint) may be mapped to a plurality of spatial parameters. Scheduling DCI may include spatial parameter information (or field) indicating one of an activated spatial parameter set/codepoint.

FIG. 8 is a diagram which represents an example of a TCI state activation/deactivation MAC CE to which the present disclosure may be applied.

For example, when a spatial parameter is a TCI state, a MAC CE for TCI states activation/deactivation for a terminal-specific PDSCH may be identified by a MAC PDU sub-header having a specific LCD (logical channel ID). TCI states activation may correspond to TCI states update. Such TCI states activation/update MAC CE may have a variable size including fields shown in FIG. 8. A description on fields illustrated in FIG. 8 is as follows.

Serving Cell ID: This field indicates identification information on a serving cell to which a corresponding MAC CE is applied. A length of this field may be 5-bit.

BWP ID: This field may indicate a DL BWP to which the MAC CE is applied and a codepoint of a BWP indicator field of DCI may be related. A length of this field may be 2-bit.

$C_i$: This field indicates whether there is octet including TCI state $ID_{i,2}$. When this field is configured as "1", there is octet including TCI state $ID_{i,2}$. When this field is configured as "0", there is no octet including TCI state $ID_{i,2}$.

TCI state $ID_{i,j}$: This field indicates a TCI state identified by a TCI-StateId parameter configured by a higher layer. Here, i corresponds to an index of a codepoint of a TCI field in DCI. TCI state $ID_{i,j}$ corresponds to a j-th TCI state for a i-th codepoint of a TCI field in DCI. A TCI codepoint that TCI state(s) are mapped may be determined by an order position among all TCI codepoints by sets of TCI state $ID_{i,j}$ fields. In other words, a first TCI codepoint having TCI state $ID_{0,1}$ and TCI state $ID_{0,2}$ may be mapped to codepoint value 0, a first TCI codepoint having TCI state $ID_{1,1}$ and TCI state $ID_{1,2}$ may be mapped to codepoint value 1 and a codepoint value may be mapped to other codepoints in order in a similar way. TCI state may be optionally included based on an indication of a $C_i$ field. For example, the maximum number of activated TCI codepoints may be 8 and the maximum number of TCI states mapped to one TCI codepoint may be 2, but a scope of the present disclosure is not limited by such a number.

R: As a reserved bit, it is configured as "0".

Figure 9:
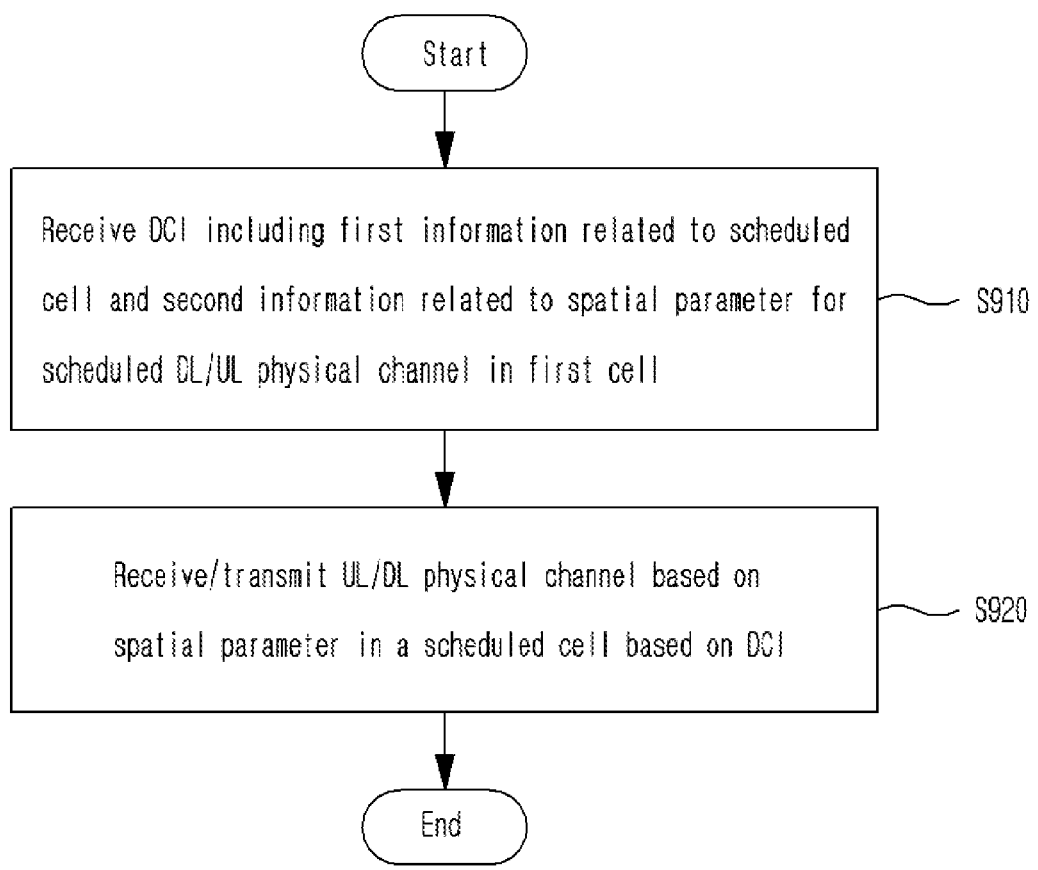
FIG. 9 is a flow chart for describing an example on a method of transmitting and receiving an uplink or a downlink supporting multi-cell scheduling according to the present disclosure.

FIG. 9 is a flow chart for describing an example on a method of transmitting and receiving an uplink or a downlink supporting multi-cell scheduling according to the present disclosure.

In S910, a terminal may receive DCI scheduling a downlink/uplink (DL/UL) physical channel (e.g., a PDSCH/a PUSCH) in a first cell from a base station. A base station may transmit the DCI to the terminal.

The DCI may include first information related to a scheduled cell and second information related to a spatial parameter for a scheduled DL/UL physical channel. For example, the first and second information may be joint-encoded by one or more fields included in the DCI. For example, one or more fields included in the DCI may be one or more of a TCI field, a SRI field, or a scheduling state field.

First information may indicate whether a scheduled cell is one cell or a plurality of cells. When a scheduled cell is one cell (i.e., single-CC scheduling), first information may indicate whether the one cell is the same first cell as a first cell that DCI is received (i.e., own-CC scheduling) or a different second cell (i.e., cross-CC scheduling). When a scheduled cell is a plurality of cells (i.e., multi-CC scheduling), first information may indicate whether the plurality of cells include or do not include the first cell. In addition, the DCI may include identifier information of one or more scheduled cells.

Second information may include QCL information applied for reception/transmission of a scheduled DL/UL physical channel. For example, QCL information may include a QCL type A/B/C RS for a channel characteristics (e.g., Doppler shift, Doppler spread, average delay, delay spread, etc.) and/or a QCL type D RS for a reception/transmission beam. Second information may include information on a cell that a QCL RS is transmitted/received.

In other words, one field of one or more fields included in DCI may basically indicate second information (i.e., spatial parameter information) and in the present disclosure, a method of indicating first information (i.e., information on a scheduled cell) based on the one field (or one or more fields different from the one field included in DCI) is described.

Joint-encoding of first and second information may mean first and second information is indicated together by one or more fields included in DCI.

For example, first and second information may be indicated by a DL spatial parameter field included in DCI (e.g., a TCI field). Alternatively, first and second information may be also indicated by an UL spatial parameter field included in DCI (e.g., a SRI field). Alternatively, first and second information may be indicated by a combination of a DL/DL spatial parameter field included in DCI (e.g., a TCI field or a SRI field) and a scheduling state field.

For example, a first field included in DCI may indicate a specific codepoint of spatial parameter codepoints. Each spatial parameter codepoint may be mapped to one or more spatial parameter candidates configured by higher layer (e.g., RRC) signaling. A spatial parameter codepoint may be activated by MAC CE signaling.

A cell indicator may be included in each spatial parameter indicated by a first field, each spatial parameter may be mapped by a higher layer to single/multi/own/cross-cell scheduling, or spatial parameter order and single/multi/own/cross-cell scheduling may be mapped according to a predefined rule/order. Some of spatial parameter codepoints may be mapped to single-cell scheduling and others may be mapped to multi-cell scheduling. Accordingly, first information may be indicated by a first field.

When a spatial parameter indicated by a first field is mapped to multi-cell scheduling, second information (e.g., QCL information) for one cell of multi-cells may be included and the same second information may be applied to the remaining cell(s) of multi-cells.

Alternatively, a spatial parameter itself indicated by a first field does not explicitly/directly include information on a first cell and based on information on a cell related to a QCL RS included in a spatial parameter (e.g., a QCL RS for a channel characteristic), first information may be implicitly/indirectly indicated.

As an additional example, first information may be indicated by the number of resource indicators indicated by a second field included in DCI. Alternatively, when a plurality of resource indicators are indicated by a second field included in DCI, single-cell scheduling may be indicated if cell identifiers related to a spatial parameter indicated by a second field are the same and multi-cell scheduling may be indicated if cell identifiers are different. Alternatively, when a plurality of resource indicators are indicated by a second field included in DCI, single-cell scheduling may be indicated if cell identifiers that a QCL RS is transmitted/received are the same in second information included in a spatial parameter indicated by a second field and multi-cell scheduling may be indicated if cell identifiers are different.

As an additional example, first and second information may be also indicated by a combination of a first field (or a second field) and a third field included in DCI. A third field may indicate first information. First information indicated by a third field may be one of 3 of own-CC scheduling, cross-CC scheduling, and multi-CC scheduling. Alternatively, first information indicated by a third field may be one of 2 of single-CC scheduling, and multi-CC scheduling. Alternatively, first information indicated by a third field may be one of 2 of own-CC scheduling and cross-CC scheduling. As such, spatial parameter candidate(s) which will be applied to a combination of one or more cells corresponding to first information indicated by a third field may be preconfigured by higher layer signaling (e.g., RRC and/or a MAC CE). As a first field (or a second field) indicates one of preconfigured spatial parameter candidate(s), second information may be indicated.

In S920, a terminal may receive/transmit a DL/UL physical channel (e.g., a PDSCH/a PUSCH) in one or more cells based on DCI. A base station may transmit/receive a DL/UL physical channel in one or more cells according to scheduling information transmitted through DCI.

The one or more cells may be determined based on first information indicated by one or more fields included in DCI. A spatial parameter applied to reception/transmission of the DL/UL physical channel may be determined based on second information indicated by one or more fields included in DCI.

Hereinafter, specific examples of the present disclosure are described.

Embodiment 1

This embodiment is about a method of indicating information (i.e., first information) on a scheduled cell (or a scheduled CC/BWP) based on a TCI codepoint indicated by a first field included in DCI (e.g., a TCI field).

The 'scheduled CC/BWP information' may include one or more of a delimiter for single CC or multi-CC scheduling, a delimiter for own-CC scheduling or cross-CC scheduling (in case of single CC scheduling), or CC ID(s) information on scheduled CC(s).

Embodiment 1 may be mainly applied to downlink physical channel (e.g., a PDSCH) scheduling, but a scope of the present disclosure is not limited thereto, and it may be also applied to other downlink physical channel or uplink physical channel other than a PDSCH.

Embodiment 1-1

Scheduled CC/BWP information may be configured/indicated together with TCI state(s) information mapped to each TCI codepoint through a TCI state activation/update MAC-CE.

For example, scheduled CC/BWP information may be 1-bit indicator information on whether it corresponds to own-CC scheduling or cross-CC scheduling. Alternatively, it may be 1-bit indicator information (e.g., a CC indicator) indicating whether it corresponds to a first scheduled CC or a second scheduled CC.

The 1-bit indicator (e.g., a CC indicator) may be included instead of a R field positioned before each TCI state $Id_{i,2}$ in an example of FIG. 8. The 1-bit indicator may be utilized as an indicator for a second TCI state mapped to a i-th TCI codepoint. A Serving Cell ID field and a BWP ID field in a corresponding MAC-CE may correspond to an ID for a scheduling CC/BWP and may not correspond to an ID for a scheduled CC/BWP. In the above-described examples, ID information on each scheduled CC/BWP may be indicated through other field in DCI.

For example, based on a 1-bit indicator (e.g., a CC indicator) based on a specific TCI state (e.g., a TCI with the lowest or highest TCI state ID), whether of cross-CC scheduling or own-CC scheduling may be determined.

For example, a case is assumed in which a first TCI codepoint is mapped to TCI state 1 and TCI state 2 through a TCI state activation/update MAC-CE and CC indicator=0 is configured for TCI state 2. When the first TCI codepoint is indicated by a TCI field included in DCI, it may mean that TCI state 1 and 2 are M-TRP scheduling for an own-CC (e.g., each TCI state is applied to a different DMRS group of the same physical channel).

For example, a case is assumed in which a first TCI codepoint is mapped to TCI state 2 and TCI state 2 through a TCI state activation/update MAC-CE and CC indicator=1 is configured for TCI state 2. When the second TCI codepoint is indicated by a TCI field included in DCI, it may mean that TCI state 1 is S-TRP scheduling for an own-CC and TCI state 2 is S-TRP scheduling for a cross-CC.

For example, a case is assumed in which a third TCI codepoint is mapped to TCI state 1, TCI state 2, and TCI state 3 through a TCI state activation/update MAC-CE and CC indicator=0 and CC indicator=1 are configured for TCI state 2 and TCI state 3, respectively. When the third TCI codepoint is indicated by a TCI field included in DCI, it may mean that TCI state 1 and 2 is M-TRP scheduling for an own-CC and TCI state 3 is S-TRP scheduling for a cross-CC.

In the above-described examples, while own-CC scheduling is indicated when a value of a 1-bit indicator is 0 and cross-CC scheduling is indicated when a value of a 1-bit indicator is 1, own-CC scheduling may be indicated when a value of a CC indicator is 1 and cross-CC scheduling may be indicated when a value of a CC indicator is 0.

The method of configuring a 1-bit indicator per TCI state is just an example and an indicator in a size of 2 bits or more may be defined in a unit of a TCI codepoint. For example, through the indicator, one of own-CC scheduling, cross-CC scheduling or multi-CC scheduling may be indicated. Accordingly, additionally or alternatively, through the indicator, whether of S-TRP or M-TRP scheduling of each CC may be indicated. Accordingly, additionally or alternatively, through the indicator, scheduled CC ID(s) information (or part of that information) may be indicated.

Embodiment 1-2

When a plurality of TCI states are mapped to all or part of TCI codepoints, whether of single-CC scheduling or multi-CC scheduling may be indicated/configured through higher layer signaling (e.g., a RRC message/a parameter). Such a configuration on a single-CC/multi-CCs may be configured per CORESET, search space, or TCI codepoint.

Embodiment 1-2-1

When a higher layer is configured by single-CC scheduling for a first TCI codepoint, it may mean that one or a plurality of TCI states indicated in the first TCI codepoint entirely correspond to the same CC scheduling.

When a higher layer is configured by multi-CC scheduling for a first TCI codepoint, only each TCI state configuration per each CC may be allowed. For example, up to 2 TCI states may be configured and when a configuration is performed by multi-CC scheduling and 2 TCI states are indicated, one TCI state may be indicated for each CC.

In this case, there is an advantage that the existing PDSCH TCI activation MAC-CE supporting up to 2 TCI states per one TCI codepoint may be utilized without any change, but there is a limit that multi-CC M-TRP transmission is not supported.

Embodiment 1-2-2

When a higher layer is configured by single-CC scheduling for a first TCI codepoint, 2 or more TCI state configurations may be allowed per each CC. Here, when the number of configured TCI states is equal to or greater than 2, it may correspond to multi-CC scheduling.

For example, when a plurality of TCI states are configured, a TCI state may be mapped per different CC (sequentially or in predetermined order). Afterwards, the remaining TCI states may be mapped per DMRS group.

For example, a TCI state may be mapped by alternating a CC and a DMRS group. For example, for 3 TCI states, a first TCI state may be mapped to a first DMRS group of an own-CC, a second TCI state may be mapped to a cross-CC and a third TCI state may be mapped to a second DMRS group of an own-CC. Here, a second TCI state may be configured to correspond to a cross-CC (i.e., a CC different from a scheduling CC).

In this case, multi-CC M-TRP scheduling may be supported.

Embodiment 1-3

Order of CCs which will be applied may be configured or predefined in order of TCI states mapped to all or part of TCI codepoints.

Embodiment 1-3-1

It may be configured/defined that an odd-numbered TCI state corresponds to an own-CC and an even-numbered TCI state corresponds to a cross-CC. Alternatively, it may be also configured/defined that an odd-numbered TCI state corresponds to a cross-CC and an even-numbered TCI state corresponds to an own-CC. In this case, when 2 or more TCI states are configured, it may correspond to multi-CC scheduling.

Here, in order to support single-CC M-TRP scheduling, when other specific value (e.g., a reserved or invalid value), not a TCI state ID (e.g., a second TCI state ID) value corresponding to a cross-CC, is configured/indicated, a terminal may be defined to ignore a corresponding value. Accordingly, a base station may indicate/configure 3 TCI states for single-CC two-TRP scheduling and configure/indicate the specific value at a position of a second TCI state.

As an additional example, when N (N is an integer equal to or greater than 1) TCI states (n=0, N−1) are applied to a total of Ncc (Ncc is an integer equal to or greater than 1) scheduled CCs, a n-th TCI state may be configured/indicated to correspond to a mod(n,Ncc)-th CC. Here, mod(x,y) is a residual value (modulo operation) obtained by dividing x by y and a 0-th CC may mean an own-CC.

Embodiment 1-3-2

It may be configured/defined that a first and second TCI state correspond to an own-CC and a third and fourth TCI state corresponds to a cross-CC. In this case, when 2 TCI states are configured, it may correspond to single-CC M-TRP scheduling and when 3 or more TCI states are configured, it may correspond to multi-CC scheduling.

Here, in order to support multi-CC S-TRP scheduling, the same RS may be configured for first and second TCI states and when a specific value (e.g., a reserved or invalid value) is configured/indicated to a second TCI state, a terminal may be defined to assume that a corresponding value is the same as a first TCI state. Accordingly, a base station may indicate/configure 3 TCI states for multi-CC S-TRP scheduling and configure the same value as a first TCI state or configure/indicate the specific value at a position of a second TCI state.

As an additional example, when N (N is an integer equal to or greater than 1) TCI states (n=0, N−1) are applied to a total of Ncc (Ncc is an integer equal to or greater than 1) scheduled CCs, a n-th TCI state may be configured/indicated to correspond to a mod(floor(n/$N_{TRP}$),Ncc)-th CC ($N_{TRP}$ is the number of TRPs in one CC). Here, mod(x,y) is a residual value (modulo operation) obtained by dividing x by y and a 0-th CC may mean an own-CC.

For the above-described embodiment 1 and detailed embodiments, it may be configured/defined that among a total of M (activated) TCI codepoints, N specific TCI codepoints are used for single-CC scheduling and the remaining M-N TCI codepoints are used for multi-CC scheduling. Alternatively, it may be configured/defined that among a total of M (activated) TCI codepoints, N specific TCI codepoints are used only for single-CC scheduling and the remaining M-N TCI codepoints are used for single-CC scheduling or multi-CC scheduling.

For example, a base station may use a N value or a value which is configured or predefined by RRC for the N TCI codepoints. For example, one or a plurality of TCI state(s) may be mapped to each of N upper TCI codepoints and all of corresponding TCI states may correspond to the same CC (e.g., for 2 TCI states, 2 TRP transmission). A plurality of TCI state(s) may be mapped to each of M-N lower TCI codepoints and corresponding TCI states may be configured/defined to correspond to a different CC. Here, mapping between a TCI state and a CC for each TCI codepoint may be based on the above-described embodiment 1-1/1-2/1-3.

As an addition example, it may be configured/defined that among a total of M (activated) TCI codepoints, N1 specific TCI codepoints are used for own-CC scheduling, N2 TCI codepoints are used for cross-CC scheduling and the remaining M-N1-N2 TCI codepoints are used for multi-CC scheduling. Alternatively, it may be configured/defined that among a total of M (activated) TCI codepoints, N1 specific TCI codepoints are used only for own-CC scheduling, N2 TCI codepoints are used only for cross-CC scheduling and the remaining M-N1-N2 TCI codepoints are used for single-CC scheduling or multi-CC scheduling.

For example, a base station may use a N1 and N2 value or a value which is configured or predefined by RRC for the N1 and N2 TCI codepoints. For example, one or a plurality of TCI state(s) may be mapped to each of N1 upper TCI codepoints and all of corresponding TCI states may correspond to an own-CC (e.g., for 2 TCI states, 2 TRP transmission). one or a plurality of TCI state(s) may be mapped to each of N2 subsequent TCI codepoints and all of corresponding TCI states may correspond to cross-CC (here, a CC ID may be separately signaled). A plurality of TCI state(s) may be mapped to each of M-N1-N2 lower TCI codepoints and corresponding TCI states may be configured/defined to correspond to a different CC. Here, mapping between a TCI state and a CC for each TCI codepoint may be based on the above-described embodiment 1-1/1-2/1-3.

For the above-described embodiment 1 and detailed embodiments, second information (e.g., QCL information, or QCL RS information, or QCL type D RS information) may be omitted for some CCs for TCI states indication/configuration applied to a plurality of CCs. In this case, when second information for a specific CC is omitted, a terminal may apply a QCL parameter (e.g., a spatial Rx parameter, Doppler, delay spread) estimated from a QCL RS specified by second information indicated/configured for a different CC (or a paired CC) to reception in a corresponding CC.

As such, whether an operation of determining second information for a specific CC based on second information for a different CC may be applied may be different according to a terminal hardware/software configuration, so it may be reported as UE capability information. In addition, it may be defined to be applied to a specific CC combination (e.g., adjacent CCs, or CCs belonging to the same band).

For the above-described embodiment 1 and detailed embodiments, scheduled CC/BWP ID(s) information may be separately indicated (e.g., through a different field in DCI). Alternatively, based on CC/BWP ID information that a QCL RS indicated by a TCI state (e.g., a QCL (type A) RS for a channel characteristic (e.g., Doppler shift, Doppler spread, average delay, delay spread, etc.)) is transmitted, scheduled CC information may be indicated. For example, if a CC ID configured for a QCL (type-A) reference RS is the same as a scheduling CC ID, it may correspond to own-CC scheduling and otherwise, it may correspond to cross-CC scheduling. In addition, a CC/BWP ID that a QCL (type-A) reference RS is configured/transmitted may be defined/configured to be the same as a scheduled CC/BWP ID.

When a QCL reference RS is separately configured as a QCL type A RS and a QCL type D RS, scheduled CC information may be indicated based on a QCL type A RS, a RS related to a channel characteristic. More generally, a QCL type D RS for beam configuration uses a common RS for a plurality of CCs, so it may be difficult to directly map a QCL type D RS configured for a different CC to a scheduled CC indication.

For the above-described embodiment 1 and detailed embodiments, an example was described that first and second information is indicated through a TCI field indicating a TCI codepoint/state for a DL physical channel (e.g., a PDSCH) and DL scheduling DCI, but a scope of the present disclosure is not limited thereto, and even for UL scheduling DCI, an UL spatial parameter may be indicated under an exemplary name like an UL TCI field. In this case, for the above-described embodiment 1 and detailed embodiments, a description on a TCI field/codepoint/state related to DL scheduling DCI may be replaced with a TCI field/codepoint/state related to UL scheduling DCI. Accordingly, a scheduled cell (i.e., first information) for an UL physical channel (e.g., a PUSCH) and a spatial parameter (i.e., second information) may be configured/indicated.

Embodiment 2

This embodiment is about a method of indicating information (i.e., first information) on a scheduled cell (or a scheduled CC/BWP) based on a value indicated by a second field included in DCI (e.g., a SRI field).

The 'scheduled CC/BWP information' may include one or more of a delimiter on single CC or multi-CC scheduling, a delimiter on own-CC scheduling or cross-CC scheduling (in case of single CC scheduling), or CC ID(s) information on scheduled CC(s).

A SRI field included in DCI may basically indicate an uplink beam/layer for a PUSCH. In the present disclosure, a method of indicating first information (i.e., a scheduled cell/CC/BWP) by using a SRI field is described.

Embodiment 2 may be mainly applied to uplink physical channel (e.g., a PUSCH) scheduling, but a scope of the present disclosure is not limited thereto, and it may be also applied to other uplink physical channel or downlink physical channel other than a PUSCH.

Embodiment 2-1

When a single SRI indication is included in DCI, it may correspond to single-CC scheduling and when a plurality of SRI indications are included, it may correspond to multi-CC scheduling.

This embodiment may be mainly applied to codebook (CB) based PUSCH transmission, but it is just one example, and a scope of the present disclosure is not limited thereto. DCI for the existing CB based PUSCH is defined to indicate only a single SRI, but this embodiment is about a new method of supporting indication of a plurality of SRIs through DCI even for a CB based PUSCH (also, even for a non-CB based PUSCH).

For example, whether of single-CC scheduling or multi-CC scheduling may be indicated based on the number of resources indicated by a SRI indicated through DCI. Here, a codepoint for each SRI may be sequentially mapped to one or more SRS resources included in a SRS resource set configured for a different CC (for a CB based PUSCH).

Embodiment 2-1-1

Scheduled CC/BWP ID(s) information may be indicated through a separate field in DCI.

In this case, for multi-CC scheduling, all of a plurality of CCs/BWP IDs may be indicated through a separate field in DCI. Alternatively, only some of a plurality of CCs/BWP ID(s) may be indicated through a separate field in DCI and examples described below may be applied to the remaining CCs/BWP ID(s).

Embodiment 2-1-2

A scheduled CC/BWP ID may be determined to be the same as CC/BWP ID information that each SRS resource is transmitted.

For example, a PUSCH CC/a BWP (or a combination thereof) may be determined based on a CC/a BWP (or a combination thereof) that a SRS resource (for a CB or a non-CB) referred to for PUSCH transmission is transmitted. In this case, there is an advantage that it does not need to separately indicate a scheduled CC/BWP ID.

For the existing SRS resource set, SRS resources belonging to the same SRS resource set are configured to be transmitted in the same CC/BWP, whereas according to the present disclosure, SRS resources transmitted in a different CC/BWP may be configured in one same SRS resource set. In other words, a CC/a BWP ID may be configured per SRS resource. More specifically, a CC/a BWP ID may be configured for each of SRS resources included in a specific SRS resource set.

Embodiment 2-1-3

A Scheduled CC/BWP ID may be determined to be the same as CC/BWP ID information that a spatial relation RS for each SRS resource (e.g., a CSI-RS, a SSB, or other RS) is transmitted.

For example, a PUSCH CC/a BWP (or a combination thereof) may be determined based on a CC/a BWP (or a combination thereof) that a spatial relation RS is transmitted. In this case, there is a limit that a base station should configure a spatial relation RS as a RS corresponding to a scheduled CC/BWP, but there is an advantage that it does not need to separately indicate a scheduled CC/BWP ID.

For the above-described embodiment 2-1 and detailed embodiment, it may be applied to a case in which a terminal indicates a single SRI for S-TRP uplink transmission instead of indicating a plurality of SRIs for a single CC for multi-TRP uplink transmission through multi-panels/beams or it may be applied to CB based PUSCH transmission rather than a non-CB based PUSCH.

Embodiment 2-2

When a plurality of SRIs are indicated through DCI, it may correspond to multi-CC scheduling when CCs/BWP IDs that SRS resources indicated by a SRI are transmitted are different and may correspond to single-CC scheduling when CCs/BWP IDs are the same.

For example, according to whether CCs/BWPs that SRS resources (for a CB or a non-CB) referred to for PUSCH transmission are transmitted are the same or different, whether of single-CC scheduling or multi-CC scheduling may be distinguished.

Here, a scheduled CC/BWP ID may be indicated/determined through separate signaling (e.g., a different field in DCI). In particular, for single-CC scheduling, information on whether of an own-CC or a cross-CC may be separately signaled. In addition, a scheduled CC/BWP ID may be determined to be the same as CC/BWP ID information that a corresponding SRS resource is transmitted as in embodiment 2-1-2 and may be determined by a CC/a BWP ID of a spatial relation RS of a SRS as in method 2-1-3.

For the existing SRS resource set, SRS resources belonging to the same SRS resource set are configured to be transmitted in the same CC/BWP, whereas according to the present disclosure, SRS resources transmitted in a different CC/BWP may be configured in one same SRS resource set. In other words, a CC/a BWP ID may be configured per SRS resource. More specifically, a CC/a BWP ID may be configured for each of SRS resources included in a specific SRS resource set.

According to this embodiment, (particularly for a CB PUSCH) when a plurality of SRIs for the same CC are indicated, it may correspond to multi-panel/beam/TRP transmission in a corresponding CC.

Embodiment 2-3

When a plurality of SRIs are indicated through DCI, it may correspond to multi-CC scheduling when CCs/BWP IDs that a spatial relation RS of SRS resources indicated by a SRI is transmitted are different and may correspond to single-CC scheduling when CCs/BWP IDs are the same.

For example, according to whether CCs/BWPs that spatial relation RSs are transmitted are the same or different, whether of single-CC scheduling or multi-CC scheduling may be distinguished.

Here, a scheduled CC/BWP ID may be indicated/determined through separate signaling (e.g., a different field in DCI). In particular, for single-CC scheduling, information on whether of an own-CC or a cross-CC may be separately signaled. In addition, a scheduled CC/BWP ID may be determined to be the same as CC/BWP ID information that a corresponding SRS resource is transmitted as in embodiment 2-1-2 and may be determined by a CC/a BWP ID of a spatial relation RS of a SRS as in method 2-1-3.

According to this embodiment, (particularly for a CB PUSCH) when a plurality of SRIs for a plurality of spatial relation RSs configured in the same CC are indicated, it may correspond to multi-panel/beam/TRP transmission in a corresponding CC.

For the above-described embodiment 2 and detailed embodiments, an example was described that first and second information is indicated through a SRI field indicating a SRS resource for an UL physical channel (e.g., a PUSCH) and UL scheduling DCI, but a scope of the present disclosure is not limited thereto, and even for DL scheduling DCI, a DL spatial parameter may be indicated through a SRI indication for DL physical channel transmission and reception. For example, a terminal may determine a DL Rx beam based on (or corresponding to) a SRS Tx beam indicated by a SRI. In this case, for the above-described embodiment 2 and detailed embodiments, a description on a SRI field/a codepoint/a SRS resource related to UL scheduling DCI may be replaced with spatial parameter indication information related to DL scheduling DCI. Accordingly, a scheduled cell (i.e., first information) and a spatial parameter (i.e., second information) for an DL physical channel (e.g., a PDSCH) may be configured/indicated.

Embodiment 3

Scheduled CC information may be indicated through separate signaling (e.g., other field other than a TCI field or a SRI field in DCI). The separate signaling may be referred to as a scheduling state field included in DCI, but a scope of the present disclosure is not limited by that name.

In this case, TCI/SRI codepoint mapping information which will be applied per scheduled CC combination may be configured separately (e.g., by RRC and/or a MAC-CE).

Embodiment 3-1

The scheduled CC combination may be configured in 3 scheduling states, own-CC scheduling, cross-CC scheduling, or multi-CC scheduling.

For example, TCI/SRI codepoint mapping information which will be applied per each scheduling state may be configured by higher layer signaling (e.g., RRC and/or a MAC-CE) for the 3 scheduling states. For example, a scheduling state field included in DCI may indicate any one of the 3 scheduling states and TCI/SRI codepoint mapping may be indicated by a corresponding value.

For example, in an example of Table 6, scheduling state=00 may correspond to own-CC scheduling, scheduling state=01 may correspond to cross-CC scheduling and scheduling state=10 may correspond to multi-CC scheduling.

TABLE 6

| | Scheduling state = 00 | Scheduling state = 01 | Scheduling state = 10 |
|---|---|---|---|
| TCI/SRI codepoint #n | Ref. RS#1/#2 (SRS resource #1/#2) for CC#1 | Ref. RS#A (SRS resource #A) for CC#2 | Ref. RS#1 (SRS resource #1) for CC#1 + Ref. RS#A/B (SRS resource #A/#B) for CC#2 |
| TCI/SRI codepoint #n + 1 | Ref. RS#1 (SRS resource #1) for CC#1 | Ref. RS#A/#B (SRS resource #A/#B) for CC#2 | Ref. RS#1/#2 (SRS resource #1/#2) for CC#1 + Ref. RS#A (SRS resource #A) for CC#2 |

Embodiment 3-2

The scheduled CC combination may be configured in 2 scheduling states, single-CC scheduling, or multi-CC scheduling.

For example, TCI/SRI codepoint mapping information which will be applied per each scheduling state may be configured by higher layer signaling (e.g., RRC and/or a MAC-CE) for the 2 scheduling states. For example, a scheduling state field included in DCI may indicate any one of the 2 scheduling states and TCI/SRI codepoint mapping may be indicated by a corresponding value.

For example, in an example of Table 7, scheduling state=00 may correspond to single-CC scheduling and scheduling state=01 may correspond to multi-CC scheduling.

For Single-CC scheduling (e.g., Scheduling state=00 in Table 7), a scheduled CC/BWP ID may be indicated through a separate field. In this case, according to whether an indicated scheduled CC/BWP ID is the same as or different from a scheduling CC/BWP ID, whether of own-CC scheduling or cross-CC scheduling may be distinguished.

TABLE 7

| | Scheduling state = 00 | Scheduling state = 01 |
|---|---|---|
| TCI/SRI codepoint #n | Ref. RS#1/#2 (SRS resource #1/#2) for CC#1 | Ref. RS#1 (SRS resource #1) for CC#1 + Ref. RS#A/#B (SRS resource #A/#B) for CC#2 |
| TCI/SRI codepoint #n + 1 | Ref RS#1 (SRS resource #1) for CC#1 | Ref. RS#1/#2 (SRS resource #1/#2) for CC#1 + Ref. RS#A (SRS resource #A) for CC#2 |

Embodiment 3-3

The scheduled CC combination may be configured in 2 scheduling states, own-CC scheduling, or cross-CC scheduling.

For example, TCI/SRI codepoint mapping information which will be applied per each scheduling state may be configured by higher layer signaling (e.g., RRC and/or a MAC-CE) for the 2 scheduling states. For example, a scheduling state field included in DCI may indicate any one of the 2 scheduling states and TCI/SRI codepoint mapping may be indicated by a corresponding value.

Such a scheduling state may include at least one of a TCI state/a SRS resource which will be applied to the same CC as a scheduling CC for Own-CC scheduling. A scheduling state may include at least one of a TCI state/a SRS resource which will be applied to a CC different from a scheduling CC for Cross-CC scheduling.

Both of the 2 scheduling states may support up to multi-CC scheduling. In this case, in order to distinguish whether of single-CC scheduling or multi-CC scheduling, embodiment 1 and 2 and detailed embodiments thereof may be additionally applied.

In addition, a plurality of scheduling states may be distinguished through a CIF (carrier indicator field) field included in DCI. In an example of Table 8, TCI/SRI codepoint mapping may be applied which corresponds to scheduling state=00 when a CC ID indicated by a CIF is CC #1 and corresponds to scheduling state=01 when a CC ID indicated by a CIF is CC #2.

TABLE 8

| | Scheduling state = 00 | Scheduling state = 01 |
|---|---|---|
| TCI/SRI codepoint #n | Ref. RS#1/#2 (SRS resource #1/#2) for CC#1 | Ref. RS#A (SRS resource #A) for CC#2 |
| TCI/SRI codepoint #n + 1 | Ref RS#1 (SRS resource #1) for CC#1 + Ref RS#A/#B (SRS resource #A/#B) for CC#2 | Ref. RS#1/#2 (SRS resource #1/#2) for CC#1 + Ref. RS#A (SRS resource #A) for CC#2 |

When multi-CC scheduling is indicated through the above-described various examples of the present disclosure, a variety of information indicated through DCI (e.g., resource allocation, an antenna port, DMRS sequence Initialization, a SRS request field, Precoding information and number of layers, PTRS-DMRS association, etc.) may be also extended to be indicated for each CC.

Figure 10:
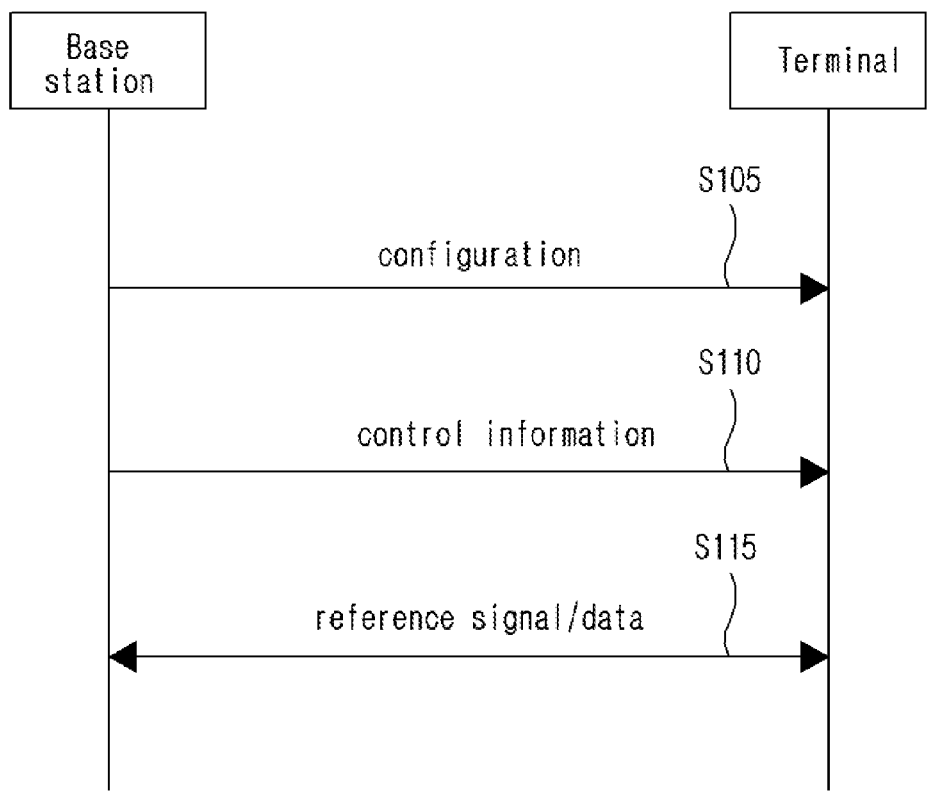
FIG. 10 is a diagram for describing a signaling procedure of a network side and a terminal according to the present disclosure.

FIG. 10 is a diagram for describing a signaling procedure of a network side and a terminal according to the present disclosure.

Figure 11:
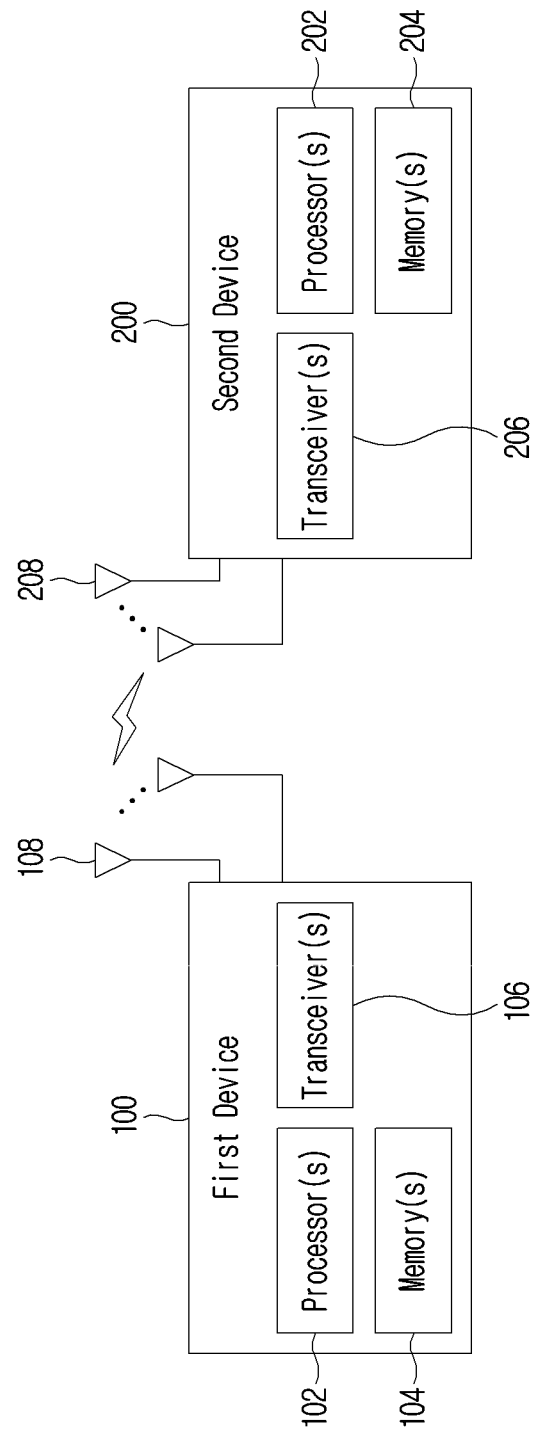
FIG. 11 illustrates a block diagram of a wireless communication system according to an embodiment of the present disclosure.

In an example of FIG. 10, UE/a network side may be an example and may be applied by being substituted with a variety of devices as in FIG. 11. FIG. 10 is just for convenience of a description, but it does not limit a scope of the present disclosure. In addition, some step(s) shown in FIG. 10 may be omitted according to a situation and/or a configuration, etc. In addition, for an operation of a network side/UE, a M-TRP related description and a DSS-related description may be referred to/used.

In the following description, a network side may be one base station including a plurality of TRPs and may be one cell including a plurality of TRPs. In an example, ideal/non-ideal backhaul may be configured between TRP 1 and TRP 2 configuring a network side. In addition, the following description is described based on multiple TRPs, but it may be equally extended and applied to transmission through multiple panels/cells.

UE may receive configuration information from a network side S105. The configuration may include system information (SI), scheduling information, a beam management (BM) related configuration (e.g., DL BM related CSI-ResourceConfig IE/NZP CSI-RS resource set IE, etc.). For example, the configuration may include information related to a configuration of a network side (e.g., a TRP configuration), resource information related to multiple TRP based transmission and reception (e.g., resource allocation information), etc. For example, the configuration may include a configuration on one or more of TCI state(s), QCL RS(s), DMRS port(s), a SRS resource set and a spatial relation RS. The configuration may be transmitted through a higher layer (e.g., RRC or a MAC CE). In addition, when the configuration information is predefined or preconfigured, a corresponding step may be omitted.

For example, based on the above-described embodiment 1/2/3 and detailed embodiments thereof, the configuration may include configuration information for multi-CC/cross-CC/own-CC scheduling. For example, the configuration may include information related to a multi-CC/single-CC configuration (e.g., whether multi-CCs are configured, information related to mapping order of a TCI state/a SRS resource and a CC, the number of TCI states/SRS resources related to multi-CCs, etc.). For example, the configuration, as described in embodiment 3, etc., may include TCI/SRI codepoint mapping information which will be applied per scheduled CC combination. For example, a configuration transmitted through a MAC-CE may include activation/deactivation information on a TCI state. For example, as in embodiment 1-1, the activation/deactivation information on a TCI state may include scheduled CC/BWP information (e.g., information related to a multi-CC/cross-CC/own-CC configuration). For example, a configuration transmitted through a MAC-CE may include a Serving Cell ID field, a BWP ID field, etc. and the information may be related to a scheduling CC/BWP.

For example, the above-described operation that UE (100/200 in FIG. 11) in S105 receives the configuration from a network side (200/100 in FIG. 11) may be implemented by a device in FIG. 11 which will be described after. For example, in reference to FIG. 11, one or more processors 102 may control one or more transceivers 106 and/or one or more memories 104, etc. to receive the configuration and one or more transceivers 106 may receive the configuration from a network side.

UE may receive control information from a network side S110. The control information may be received through a control channel (e.g., a PDCCH). In an example, the control information may be DCI. For single DCI based cooperative transmission, the control information may be transmitted through/with a representative TRP of TRPs configuring a network side and for multiple DCI based cooperative transmission, the control information may be transmitted through/with each TRP configuring a network side.

For example, based on the above-described embodiment 1/2/3 and detailed embodiments thereof, the control information may include information on TCI state(s), QCL RS(s), DMRS port(s), etc. and/or a SRI field, etc. For example, one or more TCI states may be indicated/configured by a TCI state field in the control information (e.g., DCI). For example, the control information may include scheduled CC/BWP ID (or index) information. Alternatively, QCL RS(s) related CC/BWP information may be used as scheduling CC/BWP information based on the control information. For example, as described in embodiment 2, etc., scheduled CC information may be configured based on a SRI field value of the control information. For example, single-CC/multi-CC scheduling may be configured based on the number of indicated SRIs. For example, based on whether a CC/a BWP ID and/or a spatial relation RS that SRS resources indicated by a SRI are transmitted is the same/different, single-CC/multi-CC scheduling may be configured/determined. For example, as described in embodiment 3, etc., the control information may include information indicating a specific combination of scheduled CC combinations.

For example, the above-described operation that UE (100/200 in FIG. 11) in S110 receives the control information from a network side (200/100 in FIG. 11) may be implemented by a device in FIG. 11 which will be described after. For example, in reference to FIG. 11, one or more processors 102 may control one or more transceivers 106 and/or one or more memories 104, etc. to receive the control information and one or more transceivers 106 may receive the control information from a network side.

UE may receive/transmit a RS/data with a network side S115. If the RS/Data is a DL RS/Data, it may be received from a network side through a DL channel (e.g., a PDCCH/a PDSCH). If the RS/Data is an UL RS/Data, it may be transmitted to a network side through an UL channel (e.g., a PUCCH/a PUSCH). The RS/Data may be scheduled based on Configuration/control information, etc. received in the S105/S110. For example, as described in the above-described embodiment 1/2/3 and detailed embodiments thereof, the RS/Data may be transmitted/received through/with a single-CC/multi-CCs, or may be transmitted/received through/with a S-TRP/M-TRPs. In addition, the Rs/Data may be transmitted/received based on an operation of a multi-CC S-TRP/a single-CC (e.g., cross-CC) S-TRP/single CC M-TRPs/multi-CC M-TRPs, etc. For example, a DL may estimate a channel from a DMRS by using a QCL type and a QCL RS indicated by a corresponding TCI state in a corresponding frequency/time/space resource and receive/demodulate the data with an estimated channel. An UL may transmit/modulate a DMRS and data/UCI by using a Tx beam and/or Tx power indicated by a corresponding TCI state in a corresponding frequency/time/space resource. For example, when a QCL (type D) RS for a specific CC is omitted for a TCI states indication/configuration applied to a plurality of CCs, UE may use/apply a corresponding QCL parameter (e.g., a spatial Rx parameter, Doppler, delay spread) estimated from a QCL (type D) RS indicated/configured for a different CC (or a paired CC) to reception in a corresponding CC.

For example, the above-described operation that UE (100/200 in FIG. 11) in S115 receives/transmits the RS/Data with a network side (200/100 in FIG. 11) may be implemented by a device in FIG. 11 which will be described after. For example, in reference to FIG. 11, one or more processors 102 may control one or more transceivers 106 and/or one or more memories 104, etc. to receive/transmit the RS/Data and one or more transceivers 106 may receive/transmit the RS/Data with a network side.

As described above, the above-described network side/UE signaling and operation (e.g., the above-described embodiment 1/2/3 and detailed embodiments thereof, FIG. 9 and FIG. 10, etc.) may be implemented by a device (e.g., FIG. 11) which will be described below. For example, a network side (e.g., TRP 1/TRP 2) may correspond to a first wireless device and UE may correspond to a second wireless device and in some cases, the opposite may be considered.

For example, the above-described network side/UE signaling and operation (e.g., the above-described embodiment 1/2/3 and detailed embodiments thereof, FIG. 9 and FIG. 10, etc.) may be processed by one or more processors in FIG. 11 (e.g., 102, 202) and the above-described network side/UE signaling and operation (e.g., the above-described embodiment 1/2/3 and detailed embodiments thereof, FIG. 9 and FIG. 10, etc.) may be stored in a memory (e.g., one or more memories in FIG. 11 (e.g., 104, 204)) in a form of a command/a program (e.g., an instruction, an executable code) for driving one or more processors in FIG. 11 (e.g., 102, 202).

General Device to which the Present Disclosure May be Applied

FIG. 11 is a diagram which illustrates a block diagram of a wireless communication system according to an embodiment of the present disclosure.

In reference to FIG. 11, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:
receiving, by a terminal from a network, downlink control information (DCI) scheduling an uplink physical channel or a downlink physical channel in a first cell, wherein the DCI includes first information related to a scheduled cell, and second information related to a spatial parameter for the uplink physical channel or the downlink physical channel to be scheduled; and
based on the DCI, performing, by the terminal, the uplink physical channel transmission or the downlink physical channel reception in the scheduled cell,
wherein the first information and the second information are jointly encoded by one or more fields included in the DCI, and
wherein the spatial parameter for the uplink physical channel is based on a sounding reference signal (SRS) resource, and the spatial parameter for the downlink physical channel is based on a transmission configuration indicator (TCI) state.

2. The method according to claim 1, wherein the first information indicates:
single-cell scheduling that the scheduled cell corresponds to one cell, or multi-cell scheduling that the scheduled cell corresponds to a plurality of cells,
based on the single-cell scheduling, own-cell scheduling that the scheduled cell corresponds to a same cell as the first cell, or cross-cell scheduling that the scheduled cell corresponds to a cell different from the first cell, or
based on the multi-cell scheduling, whether the first cell is included in the plurality of cells.

3. The method according to claim 1, wherein:
the second information includes information on one or more of a sounding reference signal (SRS) resource for the uplink physical channel, a spatial relation reference signal (RS) for the uplink physical channel or a quasi-co-location (QCL) RS for the downlink physical channel.

4. The method according to claim 1, wherein based on one or more fields included in the DCI being one field related to a downlink spatial parameter, the first information is indicated based on one or more of:
a cell indicator included in each of one or more spatial parameters indicated by the one field,
mapping by higher layer signaling between the one or more spatial parameters and multi-cell scheduling, single-cell scheduling, own-cell scheduling, or cross-cell scheduling,
mapping by a predetermined rule between the one or more spatial parameters and multi-cell scheduling, single-cell scheduling, own-cell scheduling, or cross-cell scheduling, or
the cell related to a quasi-co-location (QCL) reference signal (RS) included in the one or more spatial parameters.

5. The method according to claim 4, wherein:
based on the first information indicating multi-cell scheduling, the second information includes the spatial parameter for one cell of multi-cells and the spatial parameter for the one cell is applied to other one or more cells of the multi-cells.

6. The method according to claim 4, wherein:
some of spatial parameter candidates related to the one field are mapped to single-cell scheduling and others are mapped to multi-cell scheduling.

7. The method according to claim 4, wherein:
the one field is a transmission configuration indicator (TCI) field.

8. The method according to claim 1, wherein based on one or more fields included in the DCI being one field related to an uplink spatial parameter, the first information is indicated based on one or more of:
a number of resource indicators indicated by the one field,
based on a plurality of the resource indicators, whether cell identifiers related to the plurality of the resource indicators are same or different, or
based on a plurality of the resource indicators, whether cell identifiers that a RS related to the plurality of the resource indicators is transmitted are same or different.

9. The method according to claim 8, wherein:
the one field is a sounding reference signal resource indicator (SRI) field.

10. The method according to claim 1, wherein:
when one or more fields included in the DCI are a plurality of fields, a first field of the plurality of fields indicates a scheduling state and a second field of the plurality of fields indicates the spatial parameter mapped to the scheduling state.

11. The method according to claim 10, wherein the scheduling state indicated by the first field indicates:
one of multi-cell scheduling, own-cell scheduling, or cross-cell scheduling,
one of multi-cell scheduling, or single-cell scheduling, or
one of own-cell scheduling, or cross-cell scheduling.

12. The method according to claim 10, wherein:
a spatial parameter candidate mapped to the scheduling state is preconfigured by higher layer signaling.

13. The method according to claim 1, wherein:
the DCI is received through a physical downlink control channel (PDCCH),
the downlink physical channel includes a physical downlink shared channel (PDSCH), and
the uplink physical channel includes a physical uplink shared channel (PUSCH).

14. A terminal comprising:
one or more transceivers; and
one or more processors connected to the one or more transceivers,
wherein the one or more processors are configured to:
receive, from a network, downlink control information (DCI) scheduling an uplink physical channel or a downlink physical channel in a first cell through the one or more transceivers, wherein the DCI includes first information related to a scheduled cell, and second information related to a spatial parameter for the uplink physical channel or the downlink physical channel to be scheduled; and
based on the DCI, perform the uplink physical channel transmission or the downlink physical channel reception in the scheduled cell through the one or more transceivers,
wherein the first information and the second information are jointly encoded by one or more fields included in the DCI, and
wherein the spatial parameter for the uplink physical channel is based on a sounding reference signal (SRS) resource, and the spatial parameter for the downlink physical channel is based on a transmission configuration indicator (TCI) state.

15. A method comprising:
transmitting, by a base station to a terminal, downlink control information (DCI) scheduling an uplink physical channel or a downlink physical channel in a first cell, wherein the DCI includes first information related to a scheduled cell, and second information related to a spatial parameter for the uplink physical channel or the downlink physical channel to be scheduled; and
based on the DCI, performing, by the base station, the uplink physical channel reception or the downlink physical channel transmission in the scheduled cell;
wherein the first information and the second information are jointly encoded by one or more fields included in the DCI, and
wherein the spatial parameter for the uplink physical channel is based on a sounding reference signal (SRS) resource, and the spatial parameter for the downlink physical channel is based on a transmission configuration indicator (TCI) state.

* * * * *